(12) United States Patent
Handzel, Jr.

(10) Patent No.: US 9,714,056 B2
(45) Date of Patent: Jul. 25, 2017

(54) METHOD OF CONTROLLING A VEHICLE HAVING AN ACTIVE LIFT AND DOWNFORCE GENERATING AERO SYSTEM

(71) Applicant: GM GLOBAL TECHNOLOGY OPERATIONS LLC, Detroit, MI (US)

(72) Inventor: J. William Handzel, Jr., Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 237 days.

(21) Appl. No.: 14/610,419

(22) Filed: Jan. 30, 2015

(65) Prior Publication Data
US 2016/0221613 A1  Aug. 4, 2016

(51) Int. Cl.
*B62D 35/00* (2006.01)
*B62D 37/02* (2006.01)
*G05D 3/10* (2006.01)

(52) U.S. Cl.
CPC ............. *B62D 35/00* (2013.01); *B62D 37/02* (2013.01); *G05D 3/10* (2013.01)

(58) Field of Classification Search
CPC ...... B62D 35/00; B62D 35/005; B62D 37/02; B62D 33/046; B60T 7/042; G05D 1/0066; B64C 37/00; B63B 29/00; G01P 5/26

See application file for complete search history.

(56) References Cited

U.S. PATENT DOCUMENTS

| | | | | |
|---|---|---|---|---|
| 3,661,347 A | * | 5/1972 | Woodworth | G05D 1/0066 244/191 |
| 5,090,766 A | * | 2/1992 | Ito | B62D 37/02 180/271 |
| 2002/0093220 A1 | * | 7/2002 | Borghi | B62D 35/005 296/180.5 |
| 2008/0100077 A1 | * | 5/2008 | Schmidt | B62D 33/046 296/24.3 |
| 2011/0219869 A1 | * | 9/2011 | Asahara | G01P 5/26 73/181 |
| 2012/0212043 A1 | * | 8/2012 | Miyata | B60T 7/042 303/9.62 |
| 2013/0226414 A1 | * | 8/2013 | De Luca | B62D 37/02 701/49 |
| 2013/0319310 A1 | * | 12/2013 | Harbin | B63B 29/00 114/71 |
| 2015/0136898 A1 | * | 5/2015 | McCoy | B64C 37/00 244/49 |

* cited by examiner

*Primary Examiner* — Yuri Kan
(74) *Attorney, Agent, or Firm* — Quinn IP Law

(57) ABSTRACT

A method of controlling a vehicle includes moving a lift generating device to generate lift when a vehicle speed is greater than a pre-defined speed, a steering angle of the vehicle is equal to or less than a minimum angle value, a lateral acceleration of the vehicle is equal to or less than a minimum lateral acceleration value, and a corner brake fluid pressure at any of the wheels is equal to or less than a minimum brake fluid pressure. A downforce generating device is moved to generate downforce when the vehicle speed is greater than the pre-defined speed, the steering angle is equal to or greater than a maximum angle value, the lateral acceleration is equal to or greater than a maximum lateral acceleration value, and the corner brake fluid pressure at any of the wheels is equal to or greater than a maximum brake fluid pressure.

17 Claims, 2 Drawing Sheets

METHOD OF CONTROLLING A VEHICLE HAVING AN ACTIVE LIFT AND DOWNFORCE GENERATING AERO SYSTEM

TECHNICAL FIELD

The disclosure generally relates to a method of controlling a vehicle equipped with an aerodynamic control system and physical devices that have the ability to generate lift or downforce.

BACKGROUND

A vehicle may include a lift generating device and/or a downforce generating device. One or both of the lift generating and the downforce generating devices may be fixed or active. When fixed, the lift generating device and the downforce generating device are immobile, and are positioned to always generate a lift or a downforce respectively. When active, the lift generating device and the downforce generating device are moveable to change the amount of lift or downforce generated respectively.

SUMMARY

A method of controlling a vehicle having an active aerodynamic control system includes determining if a speed of the vehicle is equal to or greater than a pre-defined speed, or if the speed of the vehicle is less than the pre-defined speed. It is further determined if a steering angle of the vehicle is equal to or less than a minimum angle value, equal to or greater than a maximum angle value, or greater than the minimum angle and less than the maximum angle value. When the speed of the vehicle is equal to or greater than the pre-defined speed, and the steering angle is equal to or less than the minimum angle value, the aerodynamic control system may be adjusted to generate lift. When the speed of the vehicle is equal to or greater than the pre-defined speed, and the steering angle is equal to or greater than the maximum angle value, the aerodynamic control system may be adjusted to generate downforce.

Accordingly, the aerodynamic control system is adjusted to either generate lift, or generate downforce, depending on the specific operating conditions of the vehicle. The aerodynamic control system may be accurately controlled, based on information from many different vehicle sensors, to optimize dynamic performance while maximizing fuel efficiency.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. The vehicle 20 may include any type and/or style of vehicle 20, and is equipped with an aerodynamic control system. The aerodynamic control system includes at least one lift generator, hereinafter referred to as the lift generating device 22, and at least one downforce generator, hereinafter referred to as the downforce generating device 24.

Figure 1:
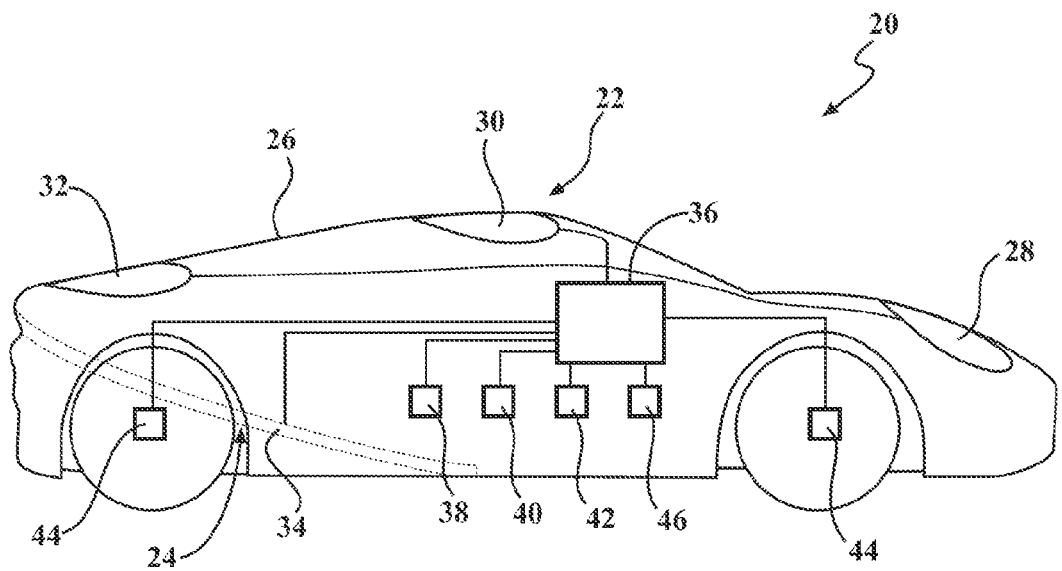
FIG. 1 is a schematic side view of a vehicle showing a lift generating device in a retracted, neutral position, and a downforce generating device in a downforce generating position.
Figure 2:
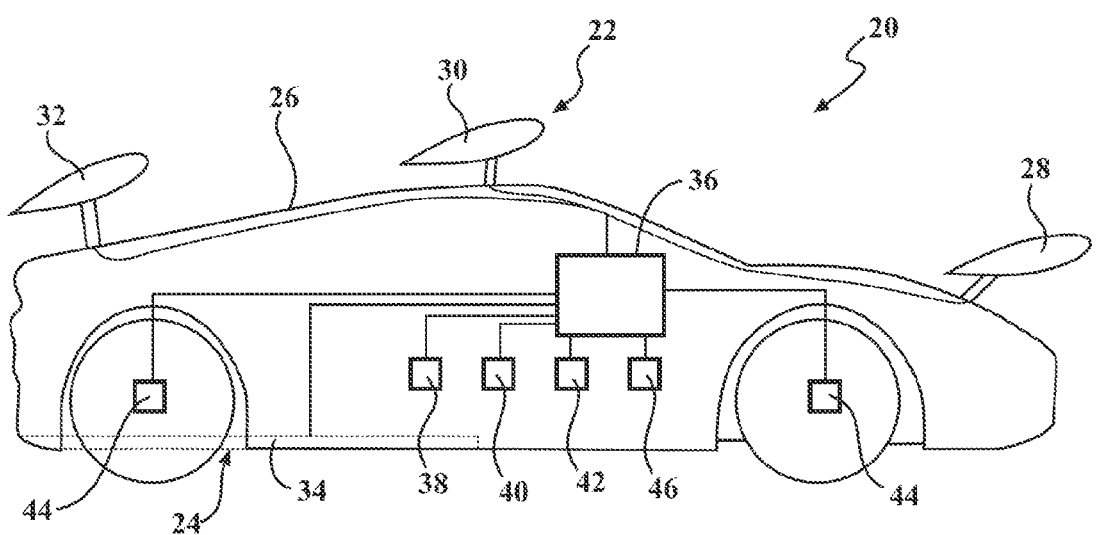
FIG. 2 is a schematic side view of the vehicle showing the lift generating device in a lift generating position, and the downforce generating device in a neutral position.

The lift generating device 22 is operable to generate lift that is applied to the vehicle 20, i.e., a force applied to the vehicle 20 in a substantially vertical direction to resist or reduce the force of gravity. The lift generating device 22 is moveable between a neutral position, shown in FIG. 1, and a lift generating position, shown in FIG. 2. When disposed in the neutral position, the lift generating device 22 is not active and does not generate any lift on the vehicle 20. When disposed in the lift generating position, the lift generating device 22 is operable to generate lift on the vehicle 20. The lift generating device 22 may be deployed at any of an infinite number of intermediate positions, between the neutral position of the lift generating device 22, and a fully deployed lift generating position, to generate a desired amount of lift. The lift generating device 22 may include, such as the exemplary embodiment of FIGS. 1 and 2, one or more aero wings disposed on an upper surface 26 of the vehicle 20. As shown in FIGS. 1 and 2, the lift generating device 22 includes a first wing 28, a second wing 30, and a third wing 32. However, it should be appreciated that the lift generating device 22 may include more or less than the three different aero wings shown in the exemplary embodiment. Additionally, while the lift generating device 22 is shown as including the three aero wings 28, 30, 32, it should be appreciated that the lift generating device 22 may be configured in some other manner capable of generating lift, and may differ from the exemplary embodiment of the aero wings shown in the Figures and described herein. When the aero wings 28, 30, 32 of the lift generating device 22 are disposed in their respective neutral positions, such as shown in FIG. 1, the aero wings 28, 30, 32 are positioned tight against the upper surface 26 of the vehicle 20, out of the way of any air flowing across or over the upper surface 26 of the vehicle 20. When the aero wings 28, 30, 32 of the lift generating device 22 are moved into their respective lift generating positions, such as shown in FIG. 2, the aero wings 28, 30, 32 are positioned above the upper surface 26 of the vehicle 20 so that the air flowing across the upper surface 26 of the vehicle 20 flows across and over the aero wings 28, 30, 32, thereby generating lift.

The downforce generating device 24 is operable to generate downforce that is applied to the vehicle 20, i.e., a force applied to the vehicle 20 in a substantially vertical direction to assist or increase the force of gravity. The downforce generating device 24 is moveable between a neutral position shown in FIG. 2, and a downforce generating position shown in FIG. 1. When disposed in the neutral position, the downforce generating device 24 is not active and does not generate any downforce on the vehicle 20. When disposed in the downforce generating position, the downforce generating device 24 is operable to generate downforce on the vehicle 20. The downforce generating device 24 may be deployed at any of an infinite number of intermediate positions, between the neutral position of the downforce generating device 24, and a fully deployed downforce generating position, to generate a desired amount of downforce. As shown in FIGS. 1 and 2, the downforce generating device 24 includes at least one moveable floor panel 34 disposed underneath a bottom or lower surface 35 of the vehicle 20, e.g., under a floor pan of the vehicle 20. However, while the downforce generating device 24 is shown as moveable floor panel 34, it should be appreciated that the downforce generating device 24 may be configured in some other manner capable of generating downforce, and may differ from the exemplary embodiment of the moveable floor panel 34 shown in the Figures and described herein. When the moveable floor panel 34 of the downforce generating device 24 are disposed in its neutral position, such as shown in FIG. 2, the moveable floor panel 34 is positioned in a substantially planar, parallel relationship relative to ground surface. When the moveable floor panel 34 of the downforce generating device 24 is moved into its respective downforce generating position, such as shown in FIG. 1, the moveable floor panel 34 is positioned along a curved path between the lower surface 35 of the body and a rearward end of the body to define an inverted airfoil, such that air flowing between the ground surface and the moveable floor panel 34 generates a downforce on the vehicle 20.

The vehicle 20 includes a controller 36, such as but not limited to a vehicle 20 control unit, to control the operation of the aerodynamic control system. The controller 36 may include a computer and/or processor, and include all software, hardware, memory, algorithms, connections, sensors, etc., necessary to manage and control the operation of the vehicle 20 and/or the aerodynamic control system As such, a method, described below and generally shown in FIG. 3, may be embodied as a program operable on the controller 36. It should be appreciated that the controller 36 may include any device capable of analyzing data from various sensors, comparing data, making the necessary decisions required to control the operation of the vehicle 20 and/or aerodynamic control system, and executing the required tasks necessary to control the operation of the vehicle 20 and the aerodynamic control system. The controller 36 is operatively connected to and in communication with each of the lift generating device 22 and the downforce generating device 24. Additionally, the controller 36 is operatively connected to and in communication with each of a speed sensor 38, a steering angle sensor 40, at least one accelerometer 42, and a brake pressure sensor 44 of each wheel of the vehicle 20. Additionally, it should be appreciated that the controller 36 is operable to move the lift generating device 22 between the neutral position of the lift generating device 22 and the fully deployed lift generating position, and move the downforce generating device 24 between the neutral position of the downforce generating device 24 and the fully deployed downforce generating position.

The controller 36 includes a tangible non-transitory memory having computer executable instructions recorded thereon, including an aerodynamic control algorithm. The controller 36 further includes a processor that is operable to execute the aerodynamic control algorithm to control the aerodynamic control system. The aerodynamic control algorithm uses the data from the vehicle sensor(s) to determine how to control the aerodynamic control system.

The controller 36 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

Figure 3:
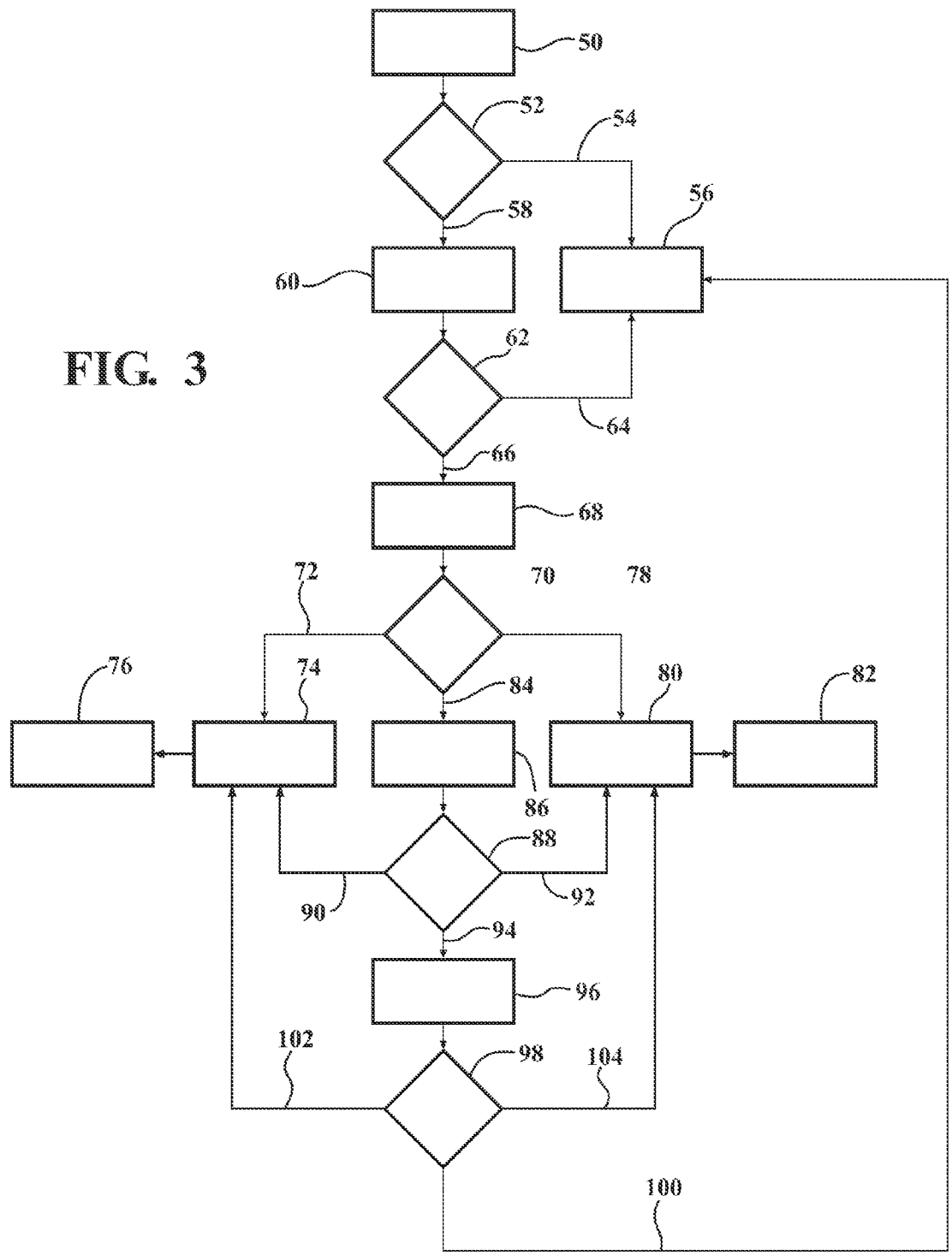
FIG. 3 is a flow chart representing a method of controlling an aerodynamic control system, including both the lift generating device and the downforce generating device, of the vehicle.

The method of controlling a vehicle 20, and more specifically of controlling the aerodynamic control system of the vehicle 20, is generally represented by the flowchart of FIG. 3. Referring to FIG. 3, the method includes sensing an operating mode of a transmission of the vehicle 20, generally indicated by box 50. As is known, vehicular transmissions include different operating modes, such as a forward drive mode, a rearward drive mode, a park mode, etc. The operating mode of the transmission may be sensed in any suitable manner, such as but not limited to sensing the operating mode of the transmission with at least one transmission position sensor 46. The current operating mode of the transmission is sensed to determine if the transmission of the vehicle 20 is currently disposed in the forward drive mode, or is not disposed in the forward drive mode, generally indicated by box 52. If the controller 36 determines that the transmission is not disposed in the forward drive mode, generally indicated at 54, then the controller 36 does not activate the aerodynamic control system, and the controller 36 maintains both the lift generating device 22 and the downforce generating device 24 in their respective neutral positions, generally indicated by box 56. Accordingly, the transmission of the vehicle 20 must be positioned in the forward drive mode in order for the controller 36 to activate either of the downforce generating device 24 or the lift generating device 22. As such, if the controller 36 determines that the transmission is not positioned in the forward drive mode, then the controller 36 does not move either of the lift generating device 22 or the downforce generating device 24 out of their respective neutral positions.

If the controller 36 determines that the transmission of the vehicle 20 is disposed in the forward drive mode, generally indicated at 58, then the speed of the vehicle 20 is sensed, generally indicated by box 60. The speed of the vehicle 20 may be sensed in any suitable manner, such as but not limited to sensing the speed of the vehicle 20 with a speed sensor 38. The speed of the vehicle 20 is sensed to determine if the speed of the vehicle 20 is equal to or greater than a pre-defined speed, or if the speed of the vehicle 20 is less than the pre-defined speed, generally indicated by box 62. The pre-defined speed may be defined to equal a minimum speed at which the controller 36 may deploy or activate either the lift generating device 22 or the downforce generating device 24. The pre-defined speed may be dependent upon, for example, the aerodynamic performance of the vehicle 20, the anticipated driving situations of the vehicle 20, a desired performance and/or efficiency level of the vehicle 20, or on many other different considerations. If the controller 36 determines that the speed of the vehicle 20 is less than the pre-defined speed, generally indicated at 64, then the controller 36 does not activate the aerodynamic control system, and the controller 36 maintains both the lift generating device 22 and the downforce generating device 24 in their respective neutral positions, generally indicated by box 56. Accordingly, the speed of the vehicle 20 must be equal to or greater than the pre-defined speed in order for the controller 36 to activate either of the downforce generating device 24 or the lift generating device 22. As such, if the controller 36 determines that the speed of the vehicle 20 is less than the pre-defined speed, then the controller 36 does not move either of the lift generating device 22 or the downforce generating device 24 out of their respective neutral positions.

If the controller 36 determines that the speed of the vehicle 20 is equal to or greater than the pre-defined speed, generally indicated at 66, then the steering angle of the vehicle 20 is sensed, generally indicated by box 68. The steering angle of the vehicle 20 may be sensed in any suitable manner, such as but not limited to sensing the steering angle of the vehicle 20 with a steering angle sensor 40 that measures the angular position of a steering wheel, or some other component of the vehicle 20's steering system. The steering angle is a measurement of how much the steering wheels of the vehicle 20 are angled relative to a longitudinal axis of the vehicle 20, i.e., how sharp the vehicle 20 is being turned. The steering angle of the vehicle 20 is sensed to determine if the steering angle of the vehicle 20 is equal to or less than a minimum angle value, if the steering angle of the vehicle 20 is equal to or greater than a maximum angle value, or if the steering angle of the vehicle 20 is greater than the minimum angle value and less than the maximum angle value, generally indicated by box 70. The minimum angle value is less than the maximum angle value. If the steering angle is less than the minimum angle value, then the steering wheels of the vehicle 20 are not being turned, or are being turned very little. If the steering angle is greater than the maximum angle value, then the steering wheels of the vehicle 20 are being turned significantly. The minimum angle value and the maximum angle value may be dependent upon, for example, the aerodynamic performance of the vehicle 20, the anticipated driving situations of the vehicle 20, a desired performance and/or efficiency level of the vehicle 20, or on many other different considerations. If the controller 36 determines that the steering angle is between the minimum angle value and the maximum angle value, i.e., greater than the minimum angle value and less than the maximum angle value, then the controller 36 proceeds to analyze the lateral acceleration of the vehicle 20.

If the controller 36 determines that the steering angle is equal to or less than the minimum angle value, generally indicated at 72, then the controller 36 activates the lift generating device 22 to generate lift. In order to activate the lift generating device 22, the controller 36 may first calculate a desired amount of lift, and then calculate a position of the aerodynamic control system, i.e., the lift generating device 22, required to generate the desired amount of lift, generally indicated by box 74. Because the vehicle 20 may not require all of the lift capable of being produced when the lift generating device 22 is positioned in the fully deployed lift generating position, the controller 36 may calculate an intermediate position, between the neutral position and the fully deployed lift generating position, required to achieve the desired amount of lift. The position of the lift generating device 22 is calculated prior to the controller 36 activating or moving the aerodynamic control system, i.e., the lift generating device 22. Once the controller 36 has calculated the desired position of the lift generating device 22, either an intermediate position or the fully deployed lift generating position of the lift generating device 22, the controller 36 then adjusts the lift generating device 22 of the aerodynamic control system to generate lift, generally indicated by box 76. Adjusting the lift generating device 22 includes moving the lift generating device 22 out of the neutral position of the lift generating device 22, into either an intermediate position or the fully deployed lift generating position of the lift generating device 22.

If the controller 36 determines that the steering angle is equal to or greater than the maximum angle value, generally indicated at 78, then the controller 36 activates the downforce generating device 24 to generate downforce. In order to activate the downforce generating device 24, the controller 36 may first calculate a desired amount of downforce, and then calculate a position of the aerodynamic control system, i.e., the downforce generating device 24, required to generate the desired amount of downforce, generally indicated by box 80. Because the vehicle 20 may not require all of the downforce capable of being produced when the downforce generating device 24 is positioned in the fully deployed downforce generating position, the controller 36 may calculate an intermediate position, between the neutral position and the fully deployed downforce generating position, required to achieve the desired amount of downforce. The position of the downforce generating device 24 is calculated prior to the controller 36 activating or moving the aerodynamic control system, i.e., the downforce generating device 24. Once the controller 36 has calculated the desired position of the downforce generating device 24, either an intermediate position or the fully deployed downforce generating position of the downforce generating device 24, the controller 36 then adjusts the downforce generating device 24 of the aerodynamic control system to generate downforce, generally indicated by box 82. Adjusting the downforce generating device 24 includes moving the downforce generating device 24 out of the neutral position of the downforce generating device 24, into either an intermediate position or the fully deployed downforce generating position of the downforce generating device 24.

As noted above, if the controller 36 determines that the steering angle of the vehicle 20 is greater than the minimum angle value, and less than the maximum angle value, generally indicated at 84, then the controller 36 analyzes the lateral acceleration of the vehicle 20 to determine if either the lift generating device 22 or the downforce generating device 24 should be activated. Analyzing the lateral acceleration of the vehicle 20 includes sensing the lateral acceleration of the vehicle 20, generally indicated by box 86. The lateral acceleration of the vehicle 20 may be sensed in any suitable manner, such as but not limited to sensing the lateral acceleration with at least one accelerometer 42. The lateral acceleration is a measurement of the lateral "g" forces being generated by the vehicle 20, such as may occur if the vehicle 20 is turning a corner at high speed. The lateral acceleration is sensed in order to determine if the lateral acceleration of the vehicle 20 is equal to or less than a minimum lateral acceleration value, equal to or greater than a maximum lateral acceleration value, or greater than the minimum lateral acceleration value and less than the maximum lateral acceleration value, generally indicated by box 88.

The minimum lateral acceleration value is less than the maximum lateral acceleration value. If the lateral acceleration of the vehicle 20 is less than the minimum lateral acceleration value, then the vehicle 20 is not moving laterally, or is moving laterally very little. If the lateral acceleration of the vehicle 20 is greater than the maximum lateral acceleration value, then the vehicle 20 is moving laterally significantly. The minimum lateral acceleration value and the maximum lateral acceleration value may be dependent upon, for example, the aerodynamic performance of the vehicle 20, the anticipated driving situations of the vehicle 20, a desired performance and/or efficiency level of the vehicle 20, or on many other different considerations. If the controller 36 determines that the lateral acceleration of the vehicle 20 is between the minimum lateral acceleration value and the maximum lateral acceleration value, i.e., greater than the minimum lateral acceleration value and less than the maximum lateral acceleration value, then the controller 36 proceeds to analyze the corner brake fluid pressure of the vehicle 20.

If the controller 36 determines that the lateral acceleration of the vehicle 20 is equal to or less than the minimum lateral acceleration value, generally indicated at 90, then the controller 36 activates the lift generating device 22 to generate lift. As described above, in order to activate the lift generating device 22, the controller 36 may first calculate a desired amount of lift and then calculate a position of the aerodynamic control system, i.e., the lift generating device 22, required to generate the desired amount of lift, generally indicated by box 74. Once the controller 36 has calculated the desired position of the lift generating device 22, either an intermediate position or the fully deployed lift generating position of the lift generating device 22, the controller 36 then adjusts, i.e., moves, the lift generating device 22 of the aerodynamic control system to generate lift, generally indicated by box 76.

If the controller 36 determines that the lateral acceleration of the vehicle 20 is equal to or greater than the maximum lateral acceleration value, generally indicated at 92, then the controller 36 activates the downforce generating device 24 to generate downforce. As described above, in order to activate the downforce generating device 24, the controller 36 may first calculate a desired amount of downforce, and then calculate a position of the aerodynamic control system, i.e., the downforce generating device 24, required to generate the desired amount of downforce, generally indicated by box 80. Once the controller 36 has calculated the desired position of the downforce generating device 24, either an intermediate position or the fully deployed downforce generating position of the downforce generating device 24, the controller 36 then adjusts, i.e., moves, the downforce generating device 24 of the aerodynamic control system to generate downforce, generally indicated by box 82.

As noted above, if the controller 36 determines that the lateral acceleration of the vehicle 20 is greater than the minimum lateral acceleration value, and less than the maximum lateral acceleration value, generally indicated at 94, then the controller 36 analyzes the corner brake fluid pressure of the vehicle 20 to determine if either the lift generating device 22 or the downforce generating device 24 should be activated. Analyzing the corner brake fluid pressure of the vehicle 20 includes sensing the brake fluid pressure being applied to each caliper controlling each wheel of the vehicle 20, generally indicated by box 96. The corner brake fluid pressure of the vehicle 20 may be sensed in any suitable manner, such as but not limited to sensing a brake fluid pressure of each wheel's caliper with a brake pressure sensor 44 located at each wheel's brake caliper respectively, or via predictive modeling in the brake controller that can provide this data. The corner brake fluid pressure may be analyzed to determine if the vehicle 20 is actively operating a stability control system, by applying brake fluid pressure to one corner of the vehicle 20 more than the other corners of the vehicle 20. The brake fluid pressure acting on each wheel is sensed to determine if the brake fluid pressure being applied to each of the wheels is equal to or less than a minimum brake fluid pressure, equal to or greater than a maximum brake fluid pressure, or greater than the minimum brake fluid pressure and less than the maximum brake fluid pressure, generally indicated by box 98.

The minimum brake fluid pressure is less than the maximum brake fluid pressure. If the brake fluid pressure of all of the wheels of the vehicle 20 is less than the minimum brake fluid pressure, then the controller 36 may determine that the vehicle 20 is not actively or currently operating a stability control system, and the aerodynamic control system may be activated. However, if the brake fluid pressure of any one of the wheels of the vehicle 20 is greater than the maximum brake fluid pressure, then the controller 36 may determine that the vehicle 20 is actively operating a stability control system, and the aerodynamic control system should not be activated. The minimum brake fluid pressure and the maximum brake fluid pressure may be dependent upon, for example, the aerodynamic performance of the vehicle 20, the anticipated driving situations of the vehicle 20, a desired performance and/or efficiency level of the vehicle 20, or on many other different considerations. If the controller 36 determines that the brake fluid pressure being applied to all of the wheels is between the minimum brake fluid pressure and the brake fluid pressure, i.e., greater than the minimum brake fluid pressure and less than the brake fluid pressure, generally indicated at 100, then the controller 36 does not activate the aerodynamic control system, and the controller 36 maintains both the lift generating device 22 and the downforce generating device 24 in their respective neutral positions, generally indicated by box 56.

If the controller 36 determines that the brake fluid pressure being applied to all of the wheels of the vehicle 20 is equal to or less than the minimum brake fluid pressure, generally indicated at 102, then the controller 36 activates the lift generating device 22 to generate lift. As described above, in order to activate the lift generating device 22, the controller 36 may first calculate a desired amount of lift, and then calculate a position of the aerodynamic control system, i.e., the lift generating device 22, required to generate the desired amount of lift, generally indicated by box 74. Once the controller 36 has calculated the desired position of the lift generating device 22, either an intermediate position or the fully deployed lift generating position of the lift generating device 22, the controller 36 then adjusts, i.e., moves, the lift generating device 22 of the aerodynamic control system to generate lift, generally indicated by box 76.

If the controller 36 determines that the brake fluid pressure being applied to one of the wheels of the vehicle 20 is equal to or greater than the maximum brake fluid pressure, generally indicated at 104, then the controller 36 activates the downforce generating device 24 to generate downforce.

As described above, in order to activate the downforce generating device 24, the controller 36 may first calculate a desired amount of downforce, and then calculate a position of the aerodynamic control system, i.e., the downforce generating device 24, required to generate the desired amount of downforce, generally indicated by box 80. Once the controller 36 has calculated the desired position of the downforce generating device 24, either an intermediate position or the fully deployed downforce generating position of the downforce generating device 24, the controller 36 then adjusts, i.e., moves, the downforce generating device 24 of the aerodynamic control system to generate downforce, generally indicated by box 82.

Accordingly, if the transmission of the vehicle 20 is not disposed in the forward drive mode, or the speed of the vehicle 20 is less than the pre-defined speed, the controller 36 does not activate the aerodynamic control system, and controller 36 maintains the lift generating device 22 and the downforce generating device 24 in their respective neutral positions. Additionally, if the transmission is disposed in the forward drive mode and the speed of the vehicle 20 is greater than the pre-defined speed, but the steering angle is between the minimum angle value and the maximum angle value, the lateral acceleration is between the minimum lateral acceleration value and the maximum acceleration value, and the brake fluid pressure being applied to all of the wheels of the vehicle 20 is between the minimum brake fluid pressure and the maximum brake fluid pressure, then the controller 36 does not activate the aerodynamic control system, and controller 36 maintains the lift generating device 22 and the downforce generating device 24 in their respective neutral positions.

The controller 36 may activate the aerodynamic control system (either the lift generating device 22 or the downforce generating device 24) when the transmission is disposed in the forward drive mode, the speed of the vehicle 20 is greater than the pre-defined speed, and the steering angle is either equal to or less than the minimum angle value, or is equal to or greater than the maximum angle value. The controller 36 may also activate the aerodynamic control system (either the lift generating device 22 or the downforce generating device 24) when the transmission is disposed in the forward drive mode, the speed of the vehicle 20 is greater than the pre-defined speed, the steering angle is between the minimum angle value and the maximum angle value, and the lateral acceleration of the vehicle 20 is either equal to or less than the minimum lateral acceleration value, or is equal to or greater than the maximum lateral acceleration value. Additionally, the controller 36 may also activate the aerodynamic control system (either the lift generating device 22 or the downforce generating device 24) when the transmission is disposed in the forward drive mode, the speed of the vehicle 20 is greater than the pre-defined speed, the steering angle is between the minimum angle value and the maximum angle value, the lateral acceleration of the vehicle 20 is between the minimum lateral acceleration value and the maximum lateral acceleration value, and the brake fluid pressure being applied to one of the wheels of the vehicle 20 is equal to or greater than the maximum brake fluid pressure.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a vehicle having an active aerodynamic control system, the method comprising:
   determining if a speed of the vehicle is equal to or greater than a pre-defined speed, or if the speed of the vehicle is less than the pre-defined speed, with a vehicle controller including tangible non-transitory memory having computer executable instructions recorded thereon, including an aerodynamic control algorithm, and a processor operable to execute the aerodynamic control algorithm to determine whether to position the active aerodynamic control system in a lift generating position or a downforce generating position;
   determining if a steering angle of the vehicle is equal to or less than a minimum angle value, or equal to or greater than a maximum angle value;
   determining if a lateral acceleration of the vehicle is equal to or less than a minimum lateral acceleration value, equal to or greater than a maximum lateral acceleration value, or greater than the minimum lateral acceleration value and less than the maximum lateral acceleration value, when the speed of the vehicle is equal to or greater than the pre-defined speed, and when the steering angle is greater than the minimum angle value and less than the maximum angle value;
   determining if a corner brake fluid pressure at any wheel of the vehicle is equal to or less than a minimum brake fluid pressure, equal to or greater than a maximum brake fluid pressure, or greater than the minimum brake fluid pressure and less than the maximum brake fluid pressure, when the speed of the vehicle is equal to or greater than the pre-defined speed, when the steering angle is greater than the minimum angle value and less than the maximum angle value, and when the lateral acceleration of the vehicle is greater than the minimum lateral acceleration value and less than the maximum lateral acceleration value;
   positioning the active aerodynamic control system, with the vehicle controller, in a position to generate lift when the speed of the vehicle is equal to or greater than the pre-defined speed, the steering angle is equal to or less than the minimum angle value, and the corner brake fluid pressure at any wheel of the vehicle is equal to or less than the minimum brake fluid pressure; and
   positioning the active aerodynamic control system, with the vehicle controller, in a position to generate downforce when the speed of the vehicle is equal to or greater than the pre-defined speed, the steering angle is equal to or greater than the maximum angle value, and the corner brake fluid pressure at any wheel of the vehicle is equal to or greater than the maximum brake fluid pressure.

2. The method set forth in claim 1 wherein adjusting the active aerodynamic control system to generate lift is further defined as adjusting the active aerodynamic control system to generate lift when the lateral acceleration of the vehicle is equal to or less than the minimum lateral acceleration value, and wherein adjusting the active aerodynamic control system to generate downforce is further defined as adjusting the active aerodynamic control system to generate downforce when the lateral acceleration of the vehicle is equal to or greater than the maximum lateral acceleration value.

3. The method set forth in claim 1 further comprising determining if a transmission of the vehicle is disposed in a forward drive mode, or is not disposed in the forward drive mode.

4. The method set forth in claim 3 wherein adjusting the active aerodynamic control system to generate lift is further defined as adjusting the active aerodynamic control system to generate lift when the transmission of the vehicle is disposed in the forward drive mode, and wherein adjusting the active aerodynamic control system to generate downforce is further defined as adjusting the active aerodynamic control system to generate downforce when the transmission of the vehicle is disposed in the forward drive mode.

5. The method set forth in claim 4 further comprising sensing the speed of the vehicle with at least one speed sensor.

6. The method set forth in claim 4 further comprising sensing the steering angle of the vehicle with at least one steering angle sensor.

7. The method set forth in claim 4 further comprising sensing the operating mode of the transmission with at least one transmission position sensor.

8. The method set forth in claim 4 further comprising sensing the lateral acceleration of the vehicle with at least one accelerometer.

9. The method set forth in claim 4 further comprising sensing the corner brake fluid pressure at each wheel of the vehicle with a brake fluid pressure sensor disposed at a brake caliper of each wheel of the vehicle respectively.

10. The method set forth in claim 1 further comprising calculating a desired position of the active aerodynamic control system required to generate a desired amount of lift, with a controller, prior to the active aerodynamic control system being adjusted to generate lift.

11. The method set forth in claim 1 further comprising calculating a desired position of the active aerodynamic control system required to generate a desired amount of downforce, with the controller, prior to the active aerodynamic control system being adjusted to generate downforce.

12. The method set forth in claim 1 wherein the active aerodynamic control system includes at least one lift generator moveable between a neutral position and a lift generating position, and at least one downforce generator moveable between a neutral position and a downforce generating position, wherein adjusting the active aerodynamic control system to generate lift is further defined as moving the at least one lift generator from the neutral position into the lift generating position to generate lift, and wherein adjusting the active aerodynamic control system to generate downforce is further defined as moving the at least one downforce generator from the neutral position into the downforce generating position.

13. A method of controlling a vehicle having a lift generator and a downforce generator, the method comprising:

sensing a speed of the vehicle with a speed sensor;
sensing a steering angle of the vehicle with a steering angle sensor;
sensing a lateral acceleration of the vehicle with at least one accelerometer;
sensing a corner brake fluid pressure at each wheel of the vehicle with a brake pressure sensor disposed at a brake caliper of each wheel of the vehicle respectively;
moving the lift generator out of a neutral position to generate lift when the speed of the vehicle is greater than a pre-defined speed, the steering angle of the vehicle is equal to or less than a minimum angle value, the lateral acceleration of the vehicle is equal to or less than a minimum lateral acceleration value, and the corner brake fluid pressure at at least one wheel of the vehicle is equal to or less than a minimum brake fluid pressure; and
moving the downforce generator out of a neutral position to generate downforce when the speed of the vehicle is greater than the pre-defined speed, the steering angle of the vehicle is equal to or greater than a maximum angle value, the lateral acceleration of the vehicle is equal to or greater than a maximum lateral acceleration value, and the corner brake fluid pressure at any of the wheels of the vehicle is equal to or greater than a maximum brake fluid pressure.

14. The method set forth in claim 13 further comprising calculating a desired position of the lift generator, between the neutral position and a maximum lift generating position of the lift generator, required to generate a desired amount of lift, prior to the lift generator being moved out of the neutral position of the lift generator.

15. The method set forth in claim 13 further comprising calculating a desired position of the downforce generator, between the neutral position and a maximum downforce generating position of the downforce generator, required to generate a desired amount of downforce, prior to the downforce generator being moved out of the neutral position of the downforce generator.

16. The method set forth in claim 13 further comprising not moving either of the lift generator or the downforce generator when the speed of the vehicle is less than the pre-defined speed, when a transmission of the vehicle is not disposed in a forward drive position, or when the steering angle of the vehicle is greater than the minimum angle value and less than the maximum angle value, the lateral acceleration of the vehicle is greater than the minimum lateral acceleration value and less than the maximum lateral acceleration value, and the corner brake fluid pressure at all of the wheels of the vehicle is greater than the minimum brake fluid pressure and less than the maximum brake fluid pressure.

17. The method set forth in claim 13 further comprising providing a controller operatively connected to and in communication with each of the lift generator, the downforce generator, the speed sensor; the steering angle sensor; the accelerometer, and the brake fluid pressure sensors, and wherein the controller is operable to move each of the lift generator and the downforce generator.

* * * * *